(12) United States Patent
Sugg

(10) Patent No.: US 7,312,694 B2
(45) Date of Patent: Dec. 25, 2007

(54) CAPACITIVE COUPLERS AND METHODS FOR COMMUNICATING DATA OVER AN ELECTRICAL POWER DELIVERY SYSTEM

(75) Inventor: Andrew Sugg, Highland, IL (US)

(73) Assignee: Ameren Corporation, St. Louis, MO (US)

(*) Notice: Subject to any disclaimer, the term of this patent is extended or adjusted under 35 U.S.C. 154(b) by 574 days.

(21) Appl. No.: 10/800,595

(22) Filed: Mar. 15, 2004

(65) Prior Publication Data
US 2004/0183619 A1 Sep. 23, 2004

Related U.S. Application Data

(60) Provisional application No. 60/455,026, filed on Mar. 14, 2003.

(51) Int. Cl.
*H04M 11/04* (2006.01)
(52) U.S. Cl. ............... 340/310.11; 340/310.16; 340/310.17; 340/538.15; 340/538.16; 375/258; 439/608; 439/709
(58) Field of Classification Search .......... 340/310.01, 340/310.16, 310.17, 538.14, 538.15, 538.16, 340/310.11; 375/219, 257, 258; 439/607, 439/608, 709
See application file for complete search history.

(56) References Cited
U.S. PATENT DOCUMENTS

| | | |
|---|---|---|
| 1,518,683 A | 12/1924 | Baker |
| 1,665,904 A | 4/1928 | Boddie |
| 1,962,611 A | 6/1934 | Nyman |
| 3,868,616 A | 2/1975 | Yonkers |
| 3,991,367 A | 11/1976 | Chapman et al. |
| 4,142,178 A | 2/1979 | Whyte et al. |
| 4,161,012 A | 7/1979 | Cunningham |
| 4,881,147 A | 11/1989 | Schaff |
| 4,899,248 A | 2/1990 | Raudabaugh |
| 5,043,838 A | 8/1991 | Sakich |
| 5,184,270 A | 2/1993 | Boyd et al. |
| 5,444,429 A | 8/1995 | Sakich et al. |
| 5,583,729 A | 12/1996 | Hassler et al. |

(Continued)

*Primary Examiner*—Davetta W. Goins
(74) *Attorney, Agent, or Firm*—Senniger Powers

(57) ABSTRACT

Capacitive couplers and methods for communicating data over an electrical power delivery system are disclosed. A device for coupling a signal onto a conductor of an electrical power delivery system includes a conductive member having a length of at least six inches but less than 200 feet and a data signal generator connected to the conductive member for supplying a data signal to the conductive member. The conductive member is adapted to capacitively couple the data signal onto the conductor. The conductive member may comprise an outer layer of a coaxial cable wherein an inner conductor of the coaxial cable is adapted to be connected to the conductor of the electrical power delivery system. The conductor may comprise a grounding wire of a surge arrester wherein the conductive member comprises a conductive medium adapted to be wrapped around the grounding wire. A method of installing a device for capacitively coupling a signal onto a conductor of an electrical power delivery system is also disclosed. The method includes selecting a conductive member having a length of at least six inches but less than 200 feet and providing a data signal generator to supply a data signal to the conductive member. The conductive member is then positioned to capacitively couple the data signal onto the conductor. Other couplers and methods are also disclosed.

58 Claims, 11 Drawing Sheets

U.S. PATENT DOCUMENTS

| | | |
|---|---|---|
| 5,684,665 A | 11/1997 | Rudy |
| 5,834,697 A * | 11/1998 | Baker et al. ............ 174/113 R |
| 5,936,825 A | 8/1999 | DuPont |
| 5,999,094 A * | 12/1999 | Nilssen ....................... 340/507 |
| 6,407,987 B1 | 6/2002 | Abraham |
| 6,441,310 B1 | 8/2002 | Niedermier et al. |
| 6,452,482 B1 * | 9/2002 | Cern .......................... 375/258 |
| 6,493,201 B1 | 12/2002 | Kulkarni et al. |
| 6,965,302 B2 * | 11/2005 | Mollenkopf et al. ........ 370/475 |
| 7,129,821 B2 * | 10/2006 | Bueti et al. ............. 340/310.11 |
| 2001/0033207 A1 | 10/2001 | Anderson et al. |
| 2002/0017496 A1 | 2/2002 | Kuriyama et al. |
| 2002/0105413 A1 | 8/2002 | Cern et al. |
| 2002/0110311 A1 | 8/2002 | Kline |
| 2002/0171535 A1 | 11/2002 | Cern |
| 2003/0151257 A1 | 8/2003 | Pinkerton |
| 2003/0160684 A1 | 8/2003 | Cern |
| 2003/0201759 A1 | 10/2003 | Cern |
| 2003/0201873 A1 | 10/2003 | Cern |
| 2003/0210135 A1 | 11/2003 | Cern |
| 2003/0222747 A1 | 12/2003 | Perkinson et al. |
| 2003/0222748 A1 | 12/2003 | Cern et al. |
| 2003/0224784 A1 | 12/2003 | Hunt et al. |

* cited by examiner

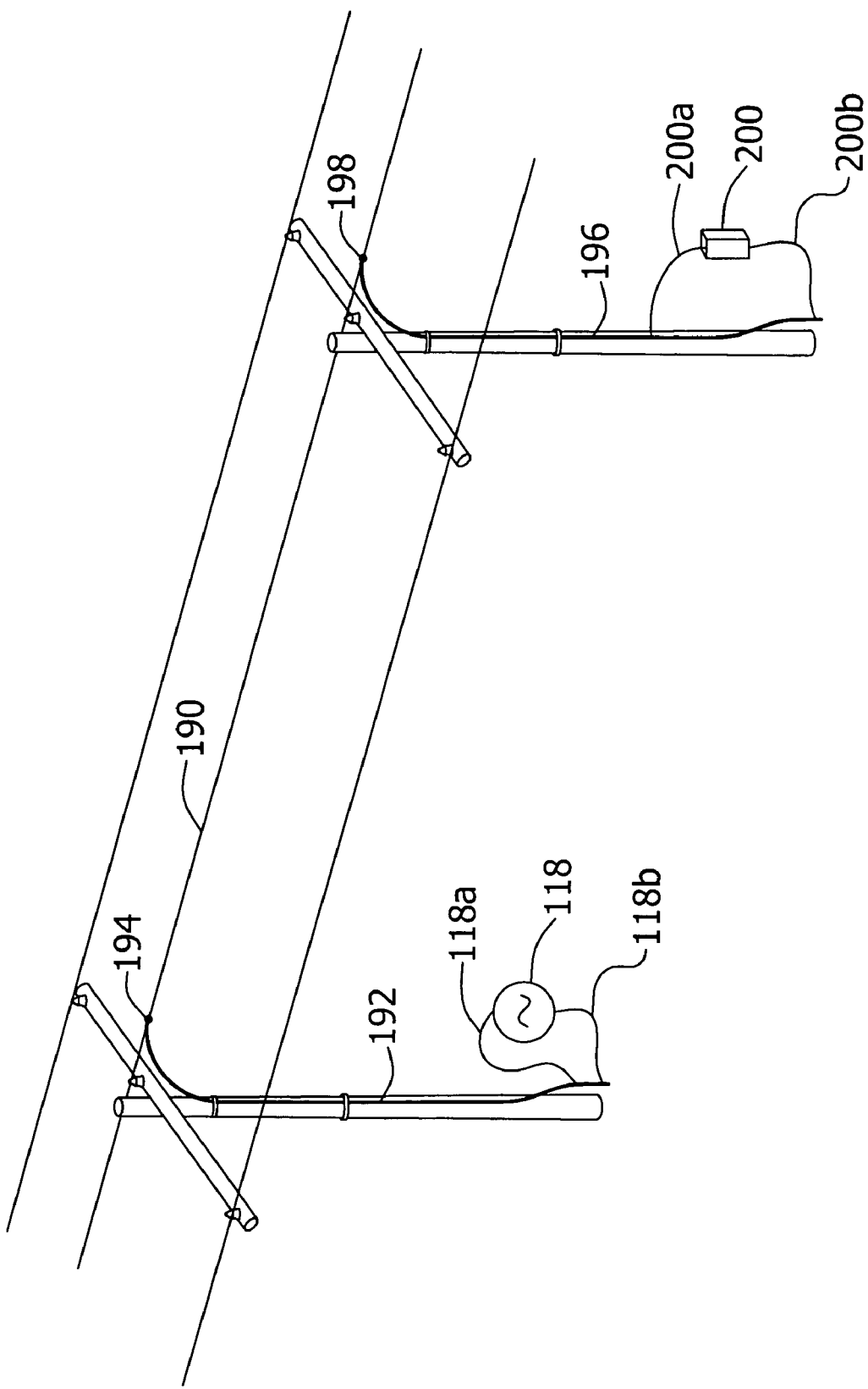

CAPACITIVE COUPLERS AND METHODS FOR COMMUNICATING DATA OVER AN ELECTRICAL POWER DELIVERY SYSTEM

BACKGROUND OF THE INVENTION

Modems have been used to couple a data signal onto the power lines of an electrical power delivery system. An example of such modems has used a toroid one-turn transformer inserted around an overhead conductor of the power delivery system. By this method of magnetic coupling, the output current of the modem, consisting of the high frequency communication signal, induces a voltage of the same frequency and in series with the overhead conductor. Farther down the line, a second such toroid one-turn transformer may be inserted around the overhead conductor so that the high frequency communication signal is magnetically induced to appear across the terminals of the second toroid one-turn transformer. The signal is then processed to recover the data. The data can then be recoupled onto the line with the same coupler to pass the data to the next coupler/modem down the line. Through use of a large number of such couplers/modems, data can be transmitted a long distance over power distribution lines.

An advantage of the toroid one-turn transformer as a coupling device is that it can readily provide isolation between the high voltage overhead conductor and the modem. Further, such a transformer has bilateral properties meaning that the coupling coefficient from the modem to the line is equal to the coupling coefficient from the line to the modem. Notwithstanding these advantages, such toroidal transformers have a relatively low coupling coefficient and insufficient gain.

There is a need for a capacitive coupler which has a relatively high coupling coefficient and gain, and which is relatively inexpensive to manufacture, install and maintain.

SUMMARY OF THE INVENTION

Among the objects of the present invention are to provide an improved capacitive coupler and method which provide sufficient galvanic insulation between the modem and the overhead conductor; to provide such a coupler and method where the impedance of the coupler matches the impedance of the overhead conductor; to provide such a coupler and method having a high coupling coefficient in both directions (coupling the data signal onto and recovering the data signal from the overhead conductor); to provide such a coupler and method having properties that are predictable and relatively insensitive to the coupler's geometry and/or the attachment of the coupler onto the overhead conductor; and to provide such a coupler and method which is relatively inexpensive to manufacture and install.

Generally, one form of the invention is a device for coupling a signal onto a conductor of an electrical power delivery system. The device includes a conductive member having a length of at least six inches but less than 200 feet and a data signal generator connected to the conductive member for supplying a data signal to the conductive member. The conductive member is adapted to capacitively couple the data signal onto the conductor. The conductive member may comprise an outer layer of a coaxial cable wherein an inner conductor of the coaxial cable is adapted to be connected to the conductor of the electrical power delivery system. The conductor may also comprise a grounding wire of a surge arrester wherein the conductive member comprises a conductive medium adapted to be wrapped around the grounding wire.

Another form of the invention is a device for capacitively coupling a signal onto a conductor of an electrical power delivery system. The device includes a conductive member adapted to be positioned along the conductor and an insulator adapted to be positioned between the conductive member and the conductor. The capacitive coupling measured between the conductive member and the conductor may be greater than 5 pF/cm.

Another form of the invention is a method of installing a device for capacitively coupling a signal onto a conductor of an electrical power delivery system. The method includes selecting a conductive member having a length of at least six inches but less than 200 feet and providing a data signal generator to supply a data signal to the conductive member. The conductive member is positioned to capacitively couple the data signal onto the conductor.

Still another form of the invention is a device for coupling a signal onto an elongated conductor of an electrical power delivery system. The device includes an elongated conductive member adapted to be positioned in parallel with the elongated conductor and a data signal generator connected to the elongated conductive member for supplying a data signal to the elongated conductive member. The elongated conductive member is adapted to capacitively couple the data signal onto the elongated conductor.

Still another form of the invention is a device for detecting a data signal coupled onto a conductor of an electrical power delivery system. The device includes a conductive member having a length of at least six inches but less than 200 feet; and a detector connected to the conductive member for detecting the data signal from the conductive member wherein the conductive member is adapted to be capacitively coupled to the conductor.

Yet still another form of the invention is a device for detecting a signal coupled onto a conductor of an electrical power delivery system. The device includes a conductive member adapted to be positioned along the conductor and an insulator adapted to be positioned between the conductive member and the conductor. The capacitive coupling measured between the conductive member and the conductor is greater than 5 pF/cm.

Yet still another form of the invention is a method of installing a device for detecting a data signal coupled onto a conductor of an electrical power delivery system. The method includes selecting a conductive member having a length of at least six inches but less than 200 feet and positioning the conductive member to capacitively couple the conductive member with the conductor. The method further includes providing a data signal detector to detect the data signal from the conductive member.

But yet still another form of the invention is a device for detecting a data signal coupled onto an elongated conductor of an electrical power delivery system. The device includes an elongated conductive member adapted to be positioned in parallel with the elongated conductor and a data signal detector connected to the elongated conductive member for detecting the data signal from the elongated conductive member. The elongated conductive member is adapted to be capacitively coupled to the elongated conductor.

Other objects and features will be in part apparent and in part pointed out hereinafter.

BRIEF DESCRIPTION OF THE DRAWINGS

FIG. 13 shows a system of the present invention using common coaxial cable to couple a signal onto a power line.

Corresponding reference characters indicate corresponding features throughout the several views of the drawings.

DETAILED DESCRIPTION OF PREFERRED EMBODIMENTS

A power line communication (PLC) system uses the electrical lines in a power distribution system to transmit and receive data. The data is coupled onto the lines as a high frequency signal using a modem having a signal source, signal detector and suitable coupler. The signal source outputs the high frequency data signal to the coupler which performs the coupling of the data signal. The data can be retrieved from the lines with the coupler and signal detector in a second modem. The second modem them retransmits the data with its coupler and signal source so that a third modem farther down the line can detect and repeat the signal as well. In this manner, data can be passed over long distances using power lines. Depending on the attenuation of the signal which occurs along the length of the lines, modems are positioned along the power line suitably close together so that the signal can be reliably received and retransmitted with the modems.

In order to improve the technical efficiency of the over all PLC network, it is important to employ coupling devices which provide sufficient galvanic insulation between the modem and the overhead conductor. Given that the power lines in a power distribution system can carry high voltages, the insulation between the coupler and the line must be sufficient to insulate against whatever voltage is carried by the line. The coupler should also provide matching between the modem and the power line impedance. This characteristic is desirable in order to minimize reflections at the point of coupling and increase the signal transfer from the modem to the line and vice-versa. The coupler should also provide a high coupling coefficient in both coupling a signal onto the line and retrieving a signal from the line. Generally, the gain of the device will be less than unity, that is, the device will introduce some attenuation to the signal. It is not necessary that the coupling device have bi-lateral properties. Its coupling coefficient, however, must be sufficiently high; otherwise, the device itself will become a significant source of signal attenuation. The coupler should also have properties which are predictable and relatively insensitive to the application on the overhead line. For example, depending on the type and size of the device, changes and variations of its geometry may occur during its installation on the overhead line. If the device properties are highly sensitive to its geometry as well as to the surroundings, the device behavior may be considerably altered after installation.

Figure 1:
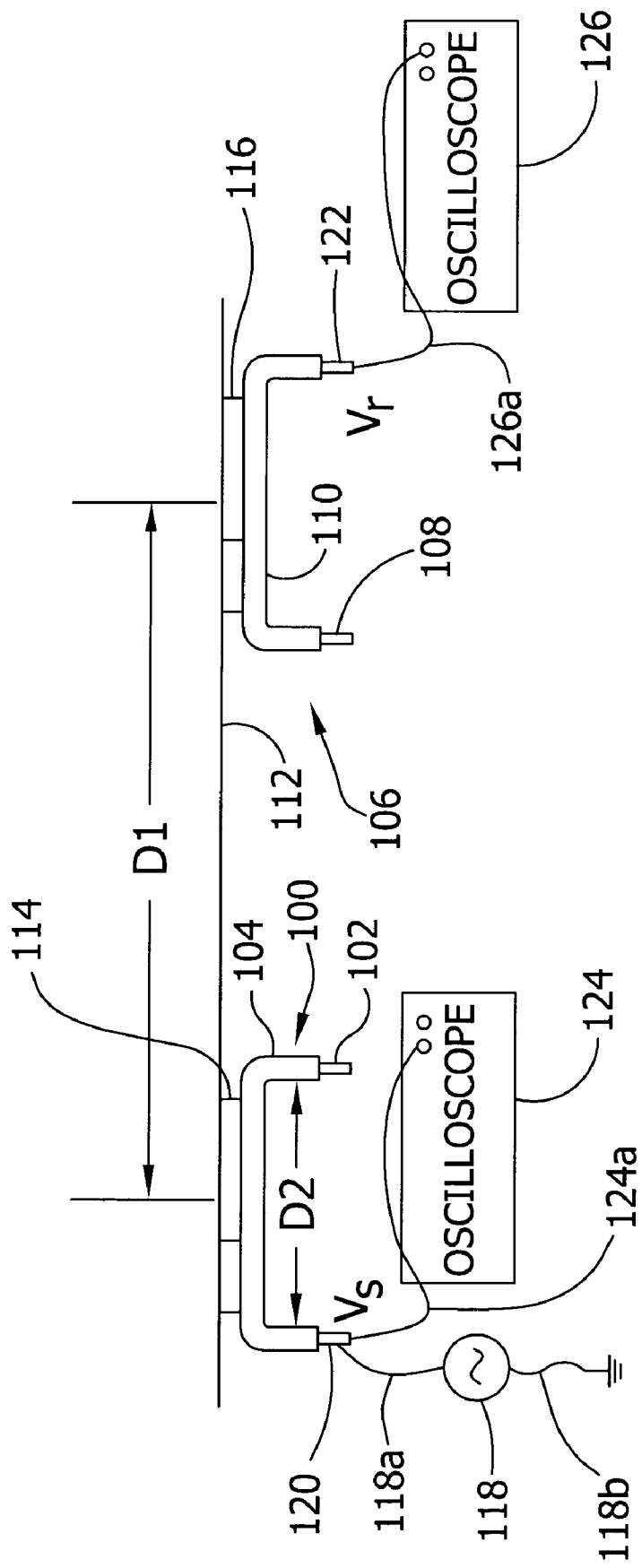
FIG. 1 shows an open-ended U-coupler configuration of the present invention.

FIG. 1 shows a U-coupler generally at 100. U-coupler 100 contains a conductor 102 substantially covered in insulation 104. U-coupler 100 is preferably made by bending a piece of insulated underground cable into the U shape shown in FIG. 1 having a base length D2 greater than the two shorter legs. The base length is preferably 30 inches. A second U-coupler 106 has the same construction including a conductor 108 and insulation 110. U-couplers 100 and 106 are coupled to an overhead conductor 112 via suitable connectors shown schematically at 114 and 116. Leads 118*a* and 118*b* of a signal source 118 are used to apply a high frequency signal to a leg 120 of U-coupler 100. The capacitive coupling between U-coupler 100 and overhead conductor 112 couples the high frequency signal onto the overhead conductor 112. Some distance D1 away, the second U-coupler 106 receives the high frequency signal through its own capacitive coupling with overhead conductor 112. The high frequency signal appears at a leg 122 for detection and retransmittal. In use, the signal source 118 produces a high frequency signal encoded with the data to be transmitted. The signal is coupled onto overhead conductor 112 via coupler 100 and is received by coupler 106. The high frequency signal appears at leg 122 for detection and retransmittal via a further detector circuit and signal generator, not shown. In order to measure the transfer gain in a channel employing two U-couplers as in FIG. 1, an oscilloscope 124 was connected via a lead 124*a* to leg 120 to measure the input signal, $V_s$. An oscilloscope 126 was connected via a lead 126*a* to leg 122 to measure the output signal, $V_r$. As shown by D1, the U-couplers were spaced 12 feet apart for this measurement. (In practice, the spacing could be significantly longer.) The U-couplers were hung upside down from the overhead line-conductor 112 (the primary voltage). The U-couplers were made from an underground cable ("UGD") of the primary voltage by stripping the copper ground shield on its outer layer. The remaining inner aluminum conductor served as a modem terminal. The remaining insulation on the cable was of the appropriate class to shield the aluminum conductor-modem system from the high overhead voltage.

An overhead conductor is used to represent the power line. At the ends of the line there are established the transmitting and receiving sites of the channel. Two similar U-couplers 100, 106 are used to establish the couplings between the transmitting site and the line on one hand, and between the line and the receiving site on the other. The horizontal section of each coupler was overlaid and fastened to the overhead line as shown in the figure. The U-couplers had an outer diameter with insulation of 2 cm and an inner aluminum conductor made of 7 strands with a diameter of 1 cm. The total length of the UGD cable used to make each U-coupler was 102 cm (40 in). The length of the horizontal portion of each U-coupler was 77 cm (30 in).

Figure 2:
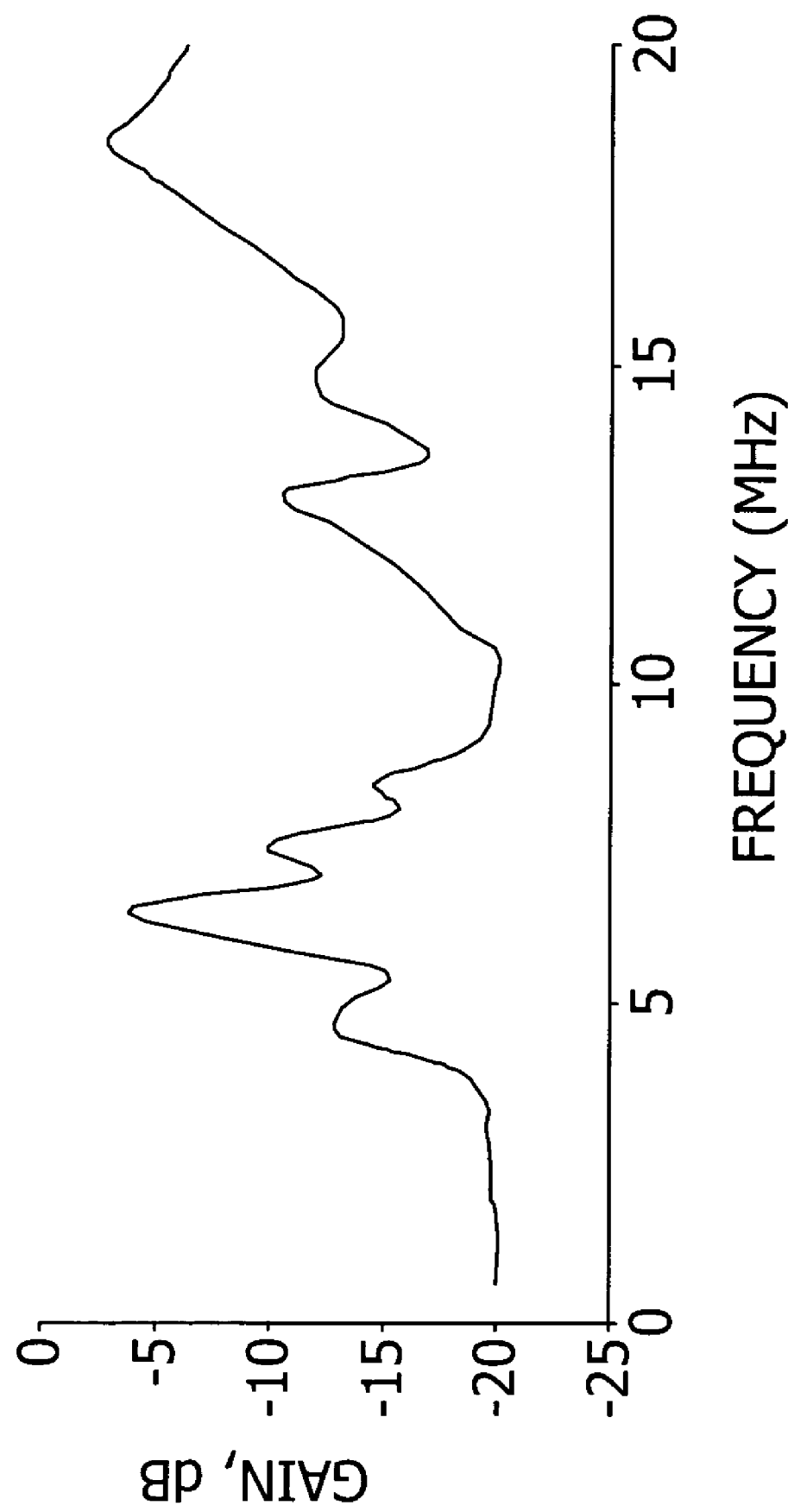
FIG. 2 shows the frequency dependent gain of the open-ended U-coupler.

An RF generator was used for signal generator 118 to represent the transmitter in a real system. The electrical lines 118*a*, 118*b* on the generator 118 were connected between the ground and leg 120 of U-coupler 100. The other end of the U-coupler 100 remained open. In a like manner, the receiver is represented by the second U-coupler 106. The input to the receiver is assumed between one leg 122 of the U-coupler 106 and ground potential. The frequency of the signal generator 118 was varied from 1 to 20 MHz by steps of ½ MHz. The voltage to ground $V_s$ at the signal generator terminal and the voltage to ground $V_r$ at the receiver terminal were measured through oscilloscopes 124 and 126 connected near the transmitter and receiver sites respectively, and were recorded. The ratio $V_r/V_s$ provided the gain of the channel. FIG. 2 shows the channel gain as function of the frequency measured by varying the signal generator from 1 to 20 MHz, as above.

The open-ended U-coupler-overhead line system shown in FIG. 1 may be viewed as an equivalent capacitive coupling between the coupler conductor and the line conductor through the capacitance of the insulation. The value of the latter was measured to be 14 pF/cm. Through this method, therefore, a portion of the signal generator voltage appears between the line conductor and the ground. Another useful representation at high signal frequencies is to view the system as two antennas coupled through their near fields. In both cases the resulting coupling is bi-lateral, that is, the coupling coefficient is the same in both directions.

With reference to FIG. 2, the resulting transfer gain is negative (that is, the device introduces attenuation). The gain value is not constant with frequency and it forms resonance near 7, 13 and 18 MHz. The average value of the gain in the range of frequency from 1 to 20 MHz is approximately −15 dB. This, in practical applications, implies that, if 1 V is injected by the transmitter, the receiver will sense approximately 178 mV.

Figure 3:
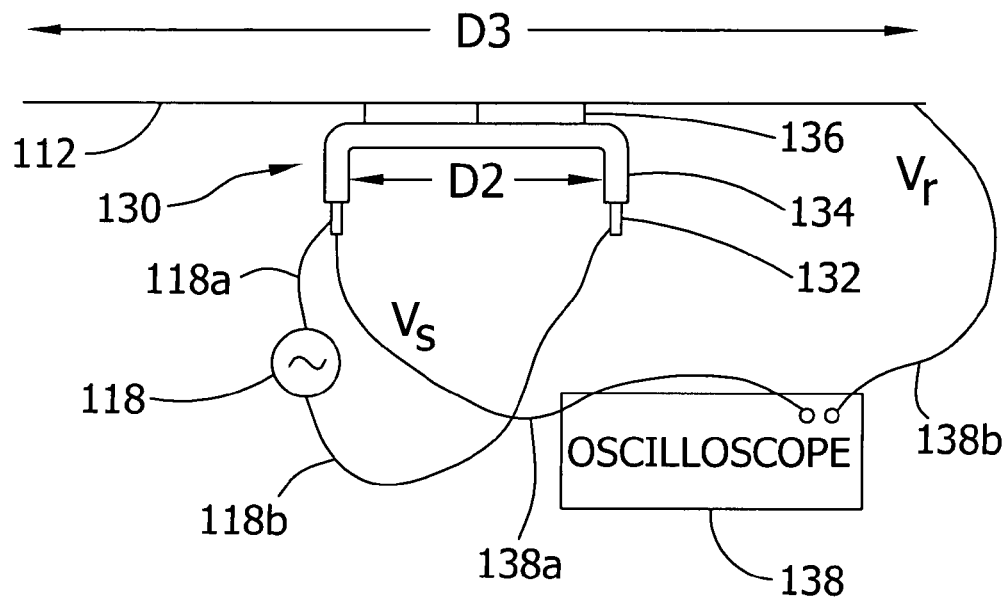
FIG. 3 shows a closed-circuited U-coupler of the present invention.

FIG. 3 shows a U-coupler generally at 130. U-coupler 130 contains a conductor 132 substantially covered in insulation 134. U-coupler 130 is preferably of the same construction as U-couplers 100 and 106 shown in FIG. 1. U-coupler 130 is hung upside down from the overhead line-conductor 112 via suitable connectors 136. FIG. 3 shows a closed-circuited U-coupler obtained when the lines 118a and 118b from signal generator 118 are shorted through the legs of U-coupler 130. Thus, the modem injects a current in series with the U-coupler 130 which in turn induces a voltage on the homologous overhead conductor 112. FIG. 3 shows the laboratory representation of the arrangement using the insulated conductor and the RF generator 118. The generator terminals are preferably connected to the coupler 134 through a series 100 Ω resistor (not shown in the figure). The overhead conductor 112 is fastened near the insulated portion of U-coupler 130.

Measurements were performed in the range from 1 to 30 MHz. For these measurements, D2 was 30 inches and the overhead line 112 had a length D3 of 6 feet. In practice, the overhead line 112 would be far longer and the distance D2 could be varied to achieve maximum cost effective coupling for the then existing circumstances. The measurements consisted of the output voltage $V_s$ of the RF generator 118 and the voltage to ground $V_r$ at one end of the overhead conductor. It was observed in the test that the overhead conductor voltage was approximately uniform throughout its length. Also it was observed that the measurements were rather insensitive to the length of that conductor.

Figure 4:
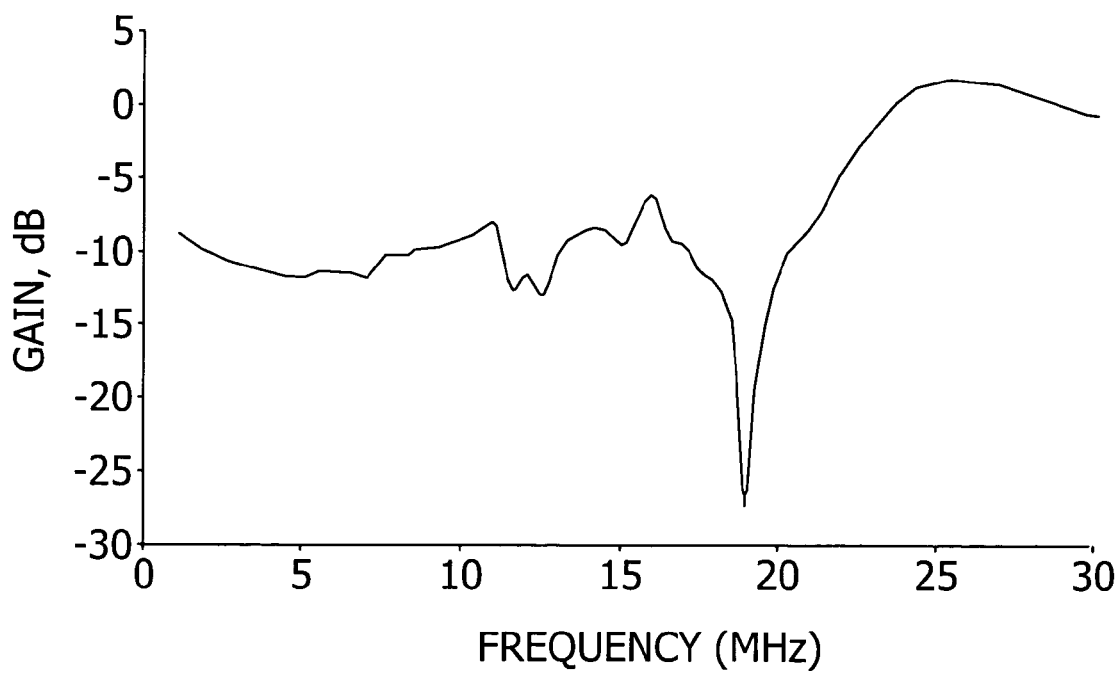
FIG. 4 shows the frequency dependent gain of the closed-circuited U-coupler.

The transfer gain of the closed circuited U-coupler 132 shown in FIG. 3 is the ratio $V_r/V_s$. This transfer gain is shown in FIG. 4. As seen there, this coupler exhibits an almost constant gain of −10 db up to 16 MHz. A sharp resonance occurs at 18.5 MHz. The gain recovers and stabilizes to around zero dB at 30 MHz.

Figure 5:
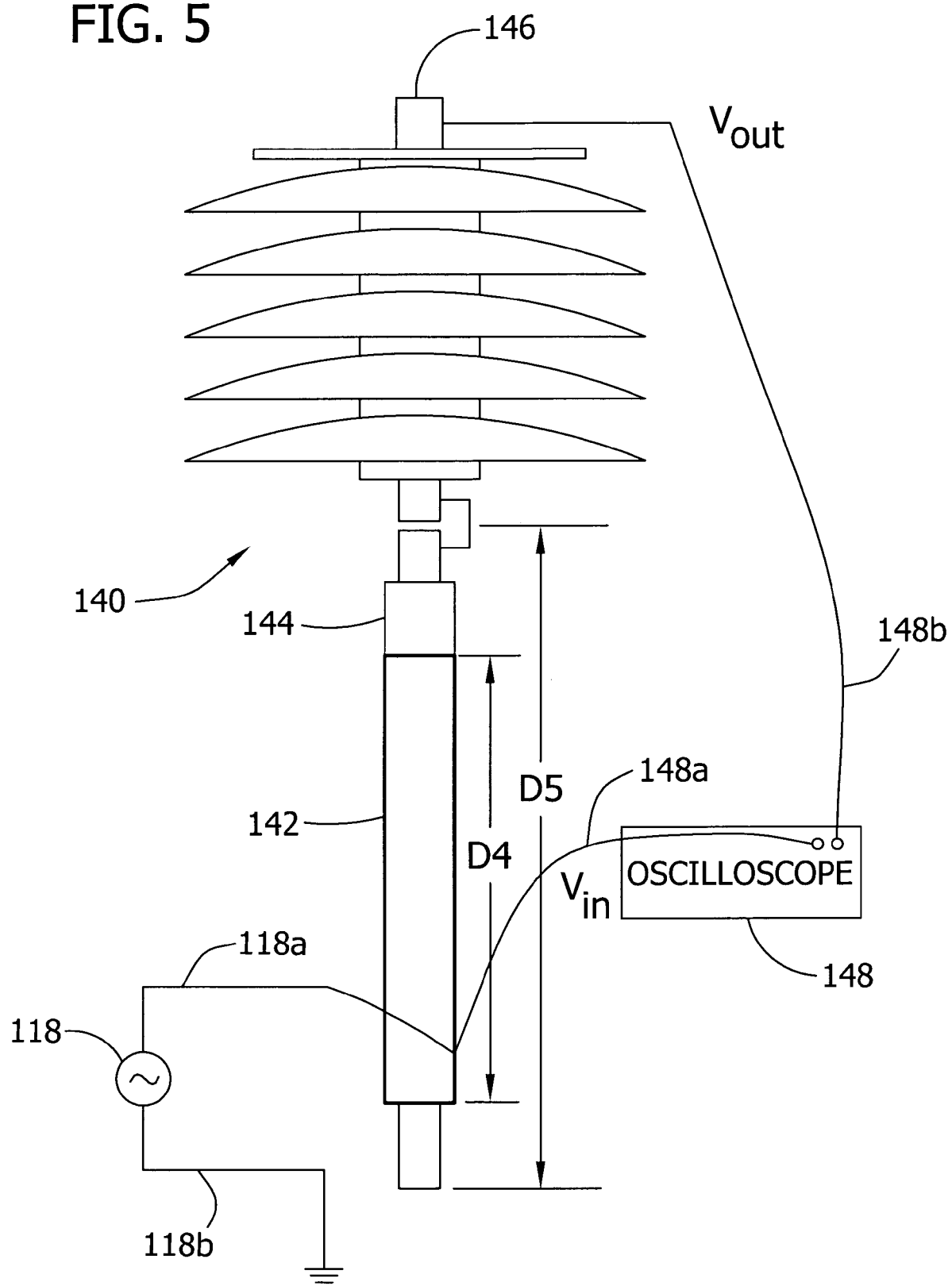
FIG. 5 shows an open A-coupler of the present invention.

FIG. 5 shows an A-coupler 140 connected to an open signal generator 118 via lines 118a and 118b. A-coupler 140 is a conventional surge arrester in common use in the electrical power industry, modified as follows. A-coupler 140 includes a conductor 142 such as aluminum foil (or other more durable conductor) wrapped around an insulator 144 of the surge arrester. The distances D4 and D5 are preferably 30 inches and 40 inches, respectively. In use, signal generator 118 applies a high frequency signal encoded with data to conductor 142. This signal is capacitively coupled onto a neutral conductor (not shown) passing through the middle of the surge arrester and then to the neutral conductor 146 appearing at the top of the surge arrester. Since neutral conductor 146 is connected to an overhead power line, this construction couples the high frequency data encoded signal onto the power line for communication of the data to other A-couplers and modems positioned down the power line.

FIG. 5 shows A-coupler 140 connected to a signal generator 118 in the open configuration with the other terminal of signal generator 118 being grounded. An oscilloscope is connected to neutral conductor 146 to measure $V_{out}$ and is connected to conductor 142 to measure $V_{in}$. It is important to maintain the modem terminals separate from the arrester neutral, so that the likelihood of modem damage is reduced when the arrester operates (surge voltage on the line). Insulator 144 performs this function, as can a separate insulator employed similar to the one used in the U-coupler of the earlier Figures. The signal generator 118 has one line 118a connected to conductor 142 and the other line 118b connected to ground. Again, conductor 142 may be formed from aluminum foil or, in practical applications, a more permanent conductive dress is used. This arrangement creates a co-axial cable. The signal from the modem is applied to the foil surrounding the insulation, rather than to the center conductor of the surge arrester. Two variations of the A-coupler were tested.

The arrangement of a surge arrester and the co-axial cable is shown in FIG. 5. The signal is applied between the concentric aluminum conductor and the conductor 142 at one end of the cable as shown in FIG. 5. The co-axial cable acting as a transmission line (wave-guide) conveys the signal to the neutral terminal inside the arrester. From the neutral of the arrester the signal couples to the line (top of the arrester) through the arrester capacitance. The latter was measured to be 140 pF and it is due to primarily the bushing (skirt) around the arrester.

Figure 6:
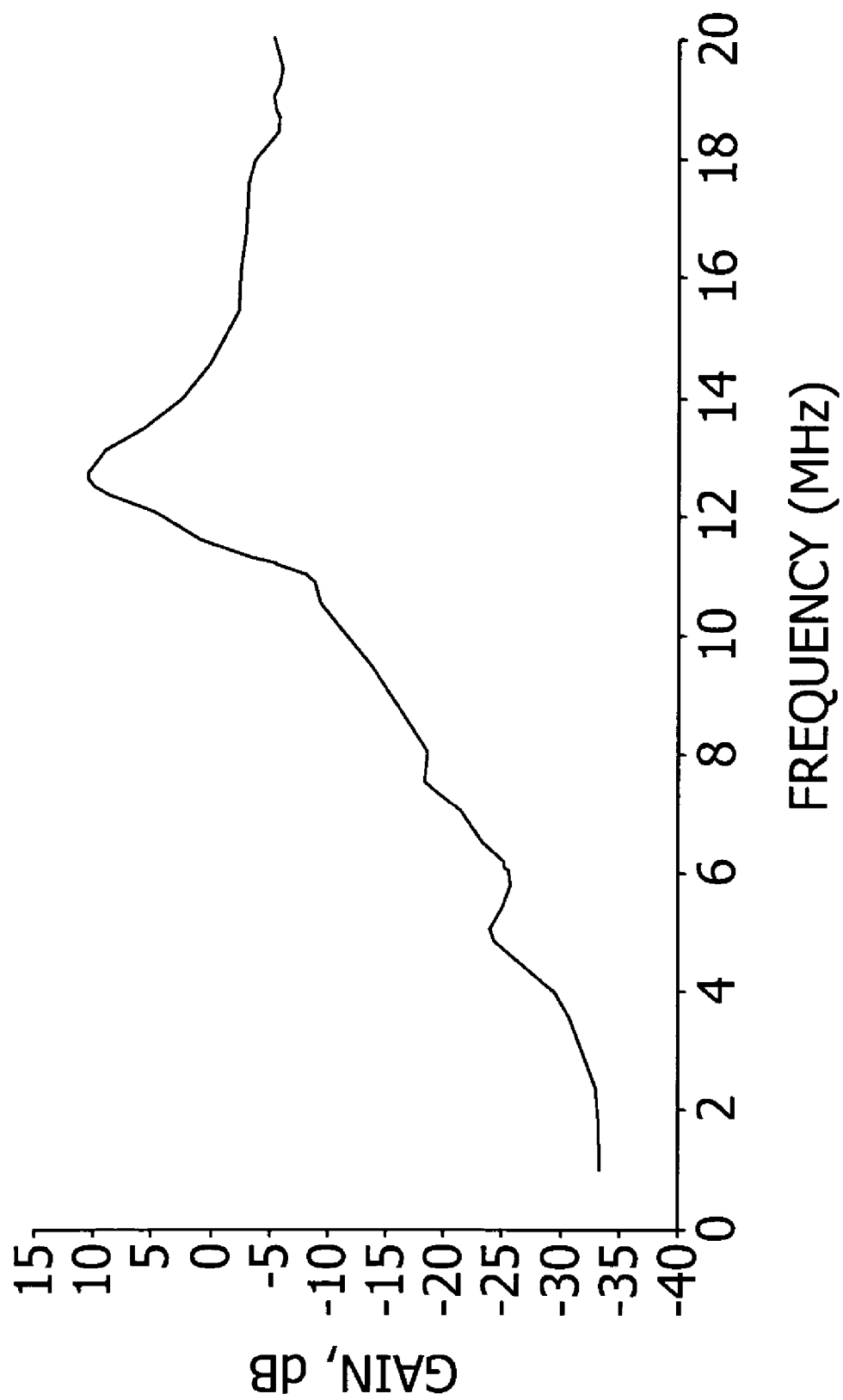
FIG. 6 shows the frequency dependent gain of the open A-coupler.

The arrester is preferably a metal oxide varistor ("MOV") type, rated at 9000 V. The transfer function gain of the open A-coupler was measured experimentally through the arrangement shown in FIG. 5. The input $V_{in}$ to the coupler is the voltage to ground injected by the RF generator 118. The output $V_{out}$ is the voltage to ground at the top terminal of the arrester. The transfer function gain calculated as the ratio $V_{out}/V_{in}$ is shown in FIG. 6. As seen in FIG. 6, the transfer function gain varies widely, providing amplification between 12 and 15 MHz and attenuation everywhere else. The amplification of the signal is due to resonance between the arrester and the cable. The average value of the gain is −10 dB. The arrester-cable system is not a bilateral device, thus a different gain is obtained between the signal entering from the top of the arrester and that recovered at the opposite end of the attached cable.

Figure 7:
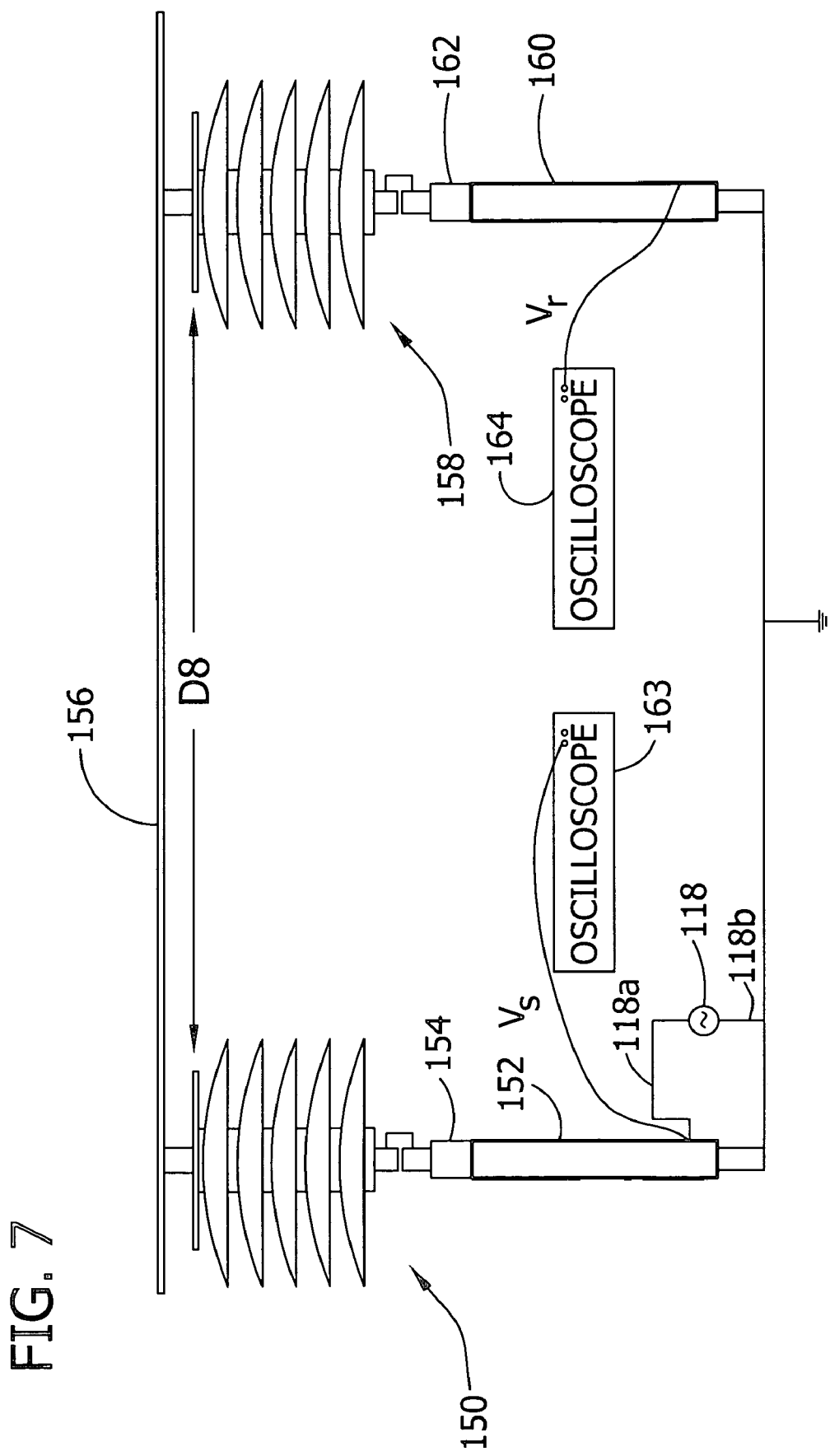
FIG. 7 shows an open A-coupler configuration of the present invention.

FIG. 7 shows an A-coupler 150 having a conductor 152 and an insulator 154. A signal generator 118 is connected in an open configuration with one terminal connected to conductor 152 and the other terminal grounded. A-coupler 150 thereby couples a high frequency signal from signal generator 118 onto an overhead conductor 156. FIG. 7 also shows a second A-coupler 158 having a conductor 160 and an insulator 162. A-coupler 158 is coupled to overhead conductor 156 for receiving the high frequency signal provided by the signal generator 118. An oscilloscope 164 measures the received signal. A-couplers 150 and 158 have the same construction and operation as A-coupler 140 shown in FIG. 5.

Figure 8:
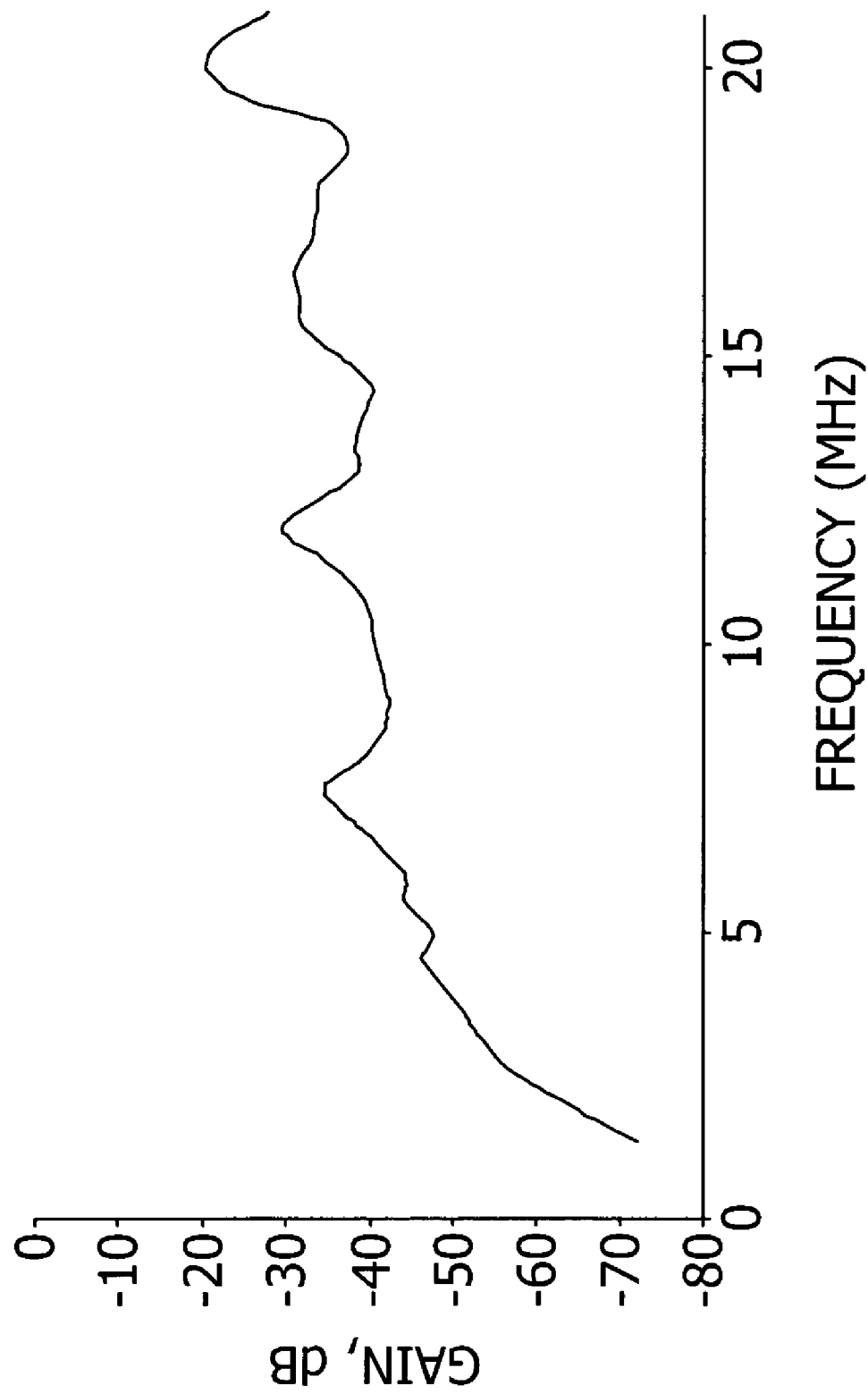
FIG. 8 shows the frequency dependent gain of the open A-coupler configuration.

FIG. 8 shows the transfer gain $V_r/V_s$ for the circuitry shown in FIG. 7 over the frequency range from 1 to 20 MHz. This data was collected with the distance D8 between the couplers was 12 feet. In practical applications, this distance could be much longer. As seen in FIG. 8, the average gain above 7 MHz is −45 dB. Thus, this arrangement introduces significant attenuation, twice as high compared to the scheme utilizing the U-coupler. The discrepancy observed in FIGS. 6 and 8 occurs because, in the test of FIG. 8, the aluminum conductor of each cable was grounded. This was necessary in order to obtain a realistic system representation, since in the practical application the aluminum conductor will also be the ground conductor of the arrester. Thus, at low frequencies (below 5 MHz), the aluminum conductor behaves as a nearly grounded terminal transmitting inappreciable voltage to the arrester. At high frequencies, however, the cable behaves closer to a wave-guide and an appreciable signal is transferred to the arrester.

The situation described above is, rather, a pessimistic assessment of the scheme, since the conductor connecting the cable to the ground was relatively short in the experiment. In practice, the conductor connecting the cable to the ground will be significantly longer. This, at high frequencies, will provide sufficient impedance between the ground and the cable and increase the signal transfer to the arrester.

Figure 9:
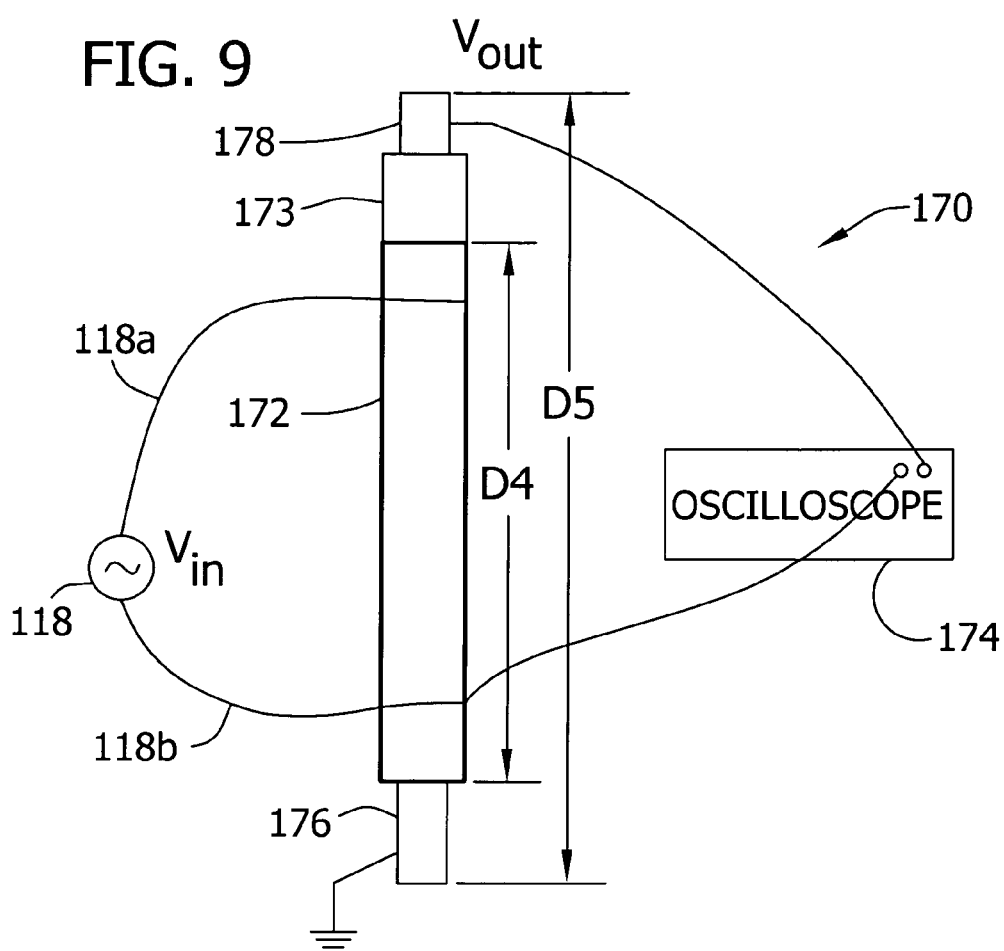
FIG. 9 shows modem site connections of the present invention.

FIG. 9 shows the lower portion 170 of a closed A-coupler having the modem terminals 118*a* and 118*b* shorted through the conductor 172 of the co-axial cable. A circuit is formed between the modem terminals and the foil. Subsequently, a current will flow along the foil of the cable, which induces a voltage to the center conductor which will appear at a neutral conductor 178 via capacitive coupling.

Figure 10:
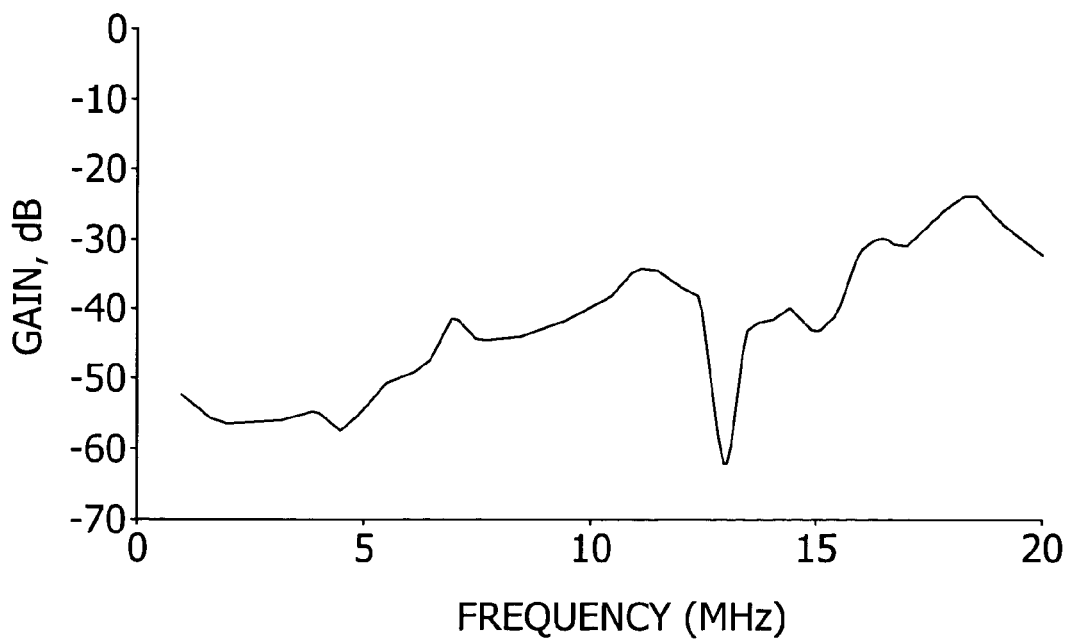
FIG. 10 shows the frequency dependent gain of the modem site connections of FIG. 9.

The transfer function of the system in FIG. 9 was tested. A differential stage consisting of a (1-100) transformer was connected to the output of the RF generator 118 in order to obtain isolation from the ground at the foil side. The bottom of the cable conductor 176 was grounded. The system transfer function is the ratio $V_{out}/V_{in}$ of the voltage to ground at the neutral conductor 178 and the differential voltage observed across the conductor 172 (output of the differential stage of the generator). Distances D4 and D5 are preferably 30 inches and 40 inches, respectively. FIG. 10 shows the gain of the single shielded cable of FIG. 9. The average value of the transfer function gain from 7 to 20 MHz was −35 dB. A strong anti-resonance formed at 13 MHz.

Figure 11:
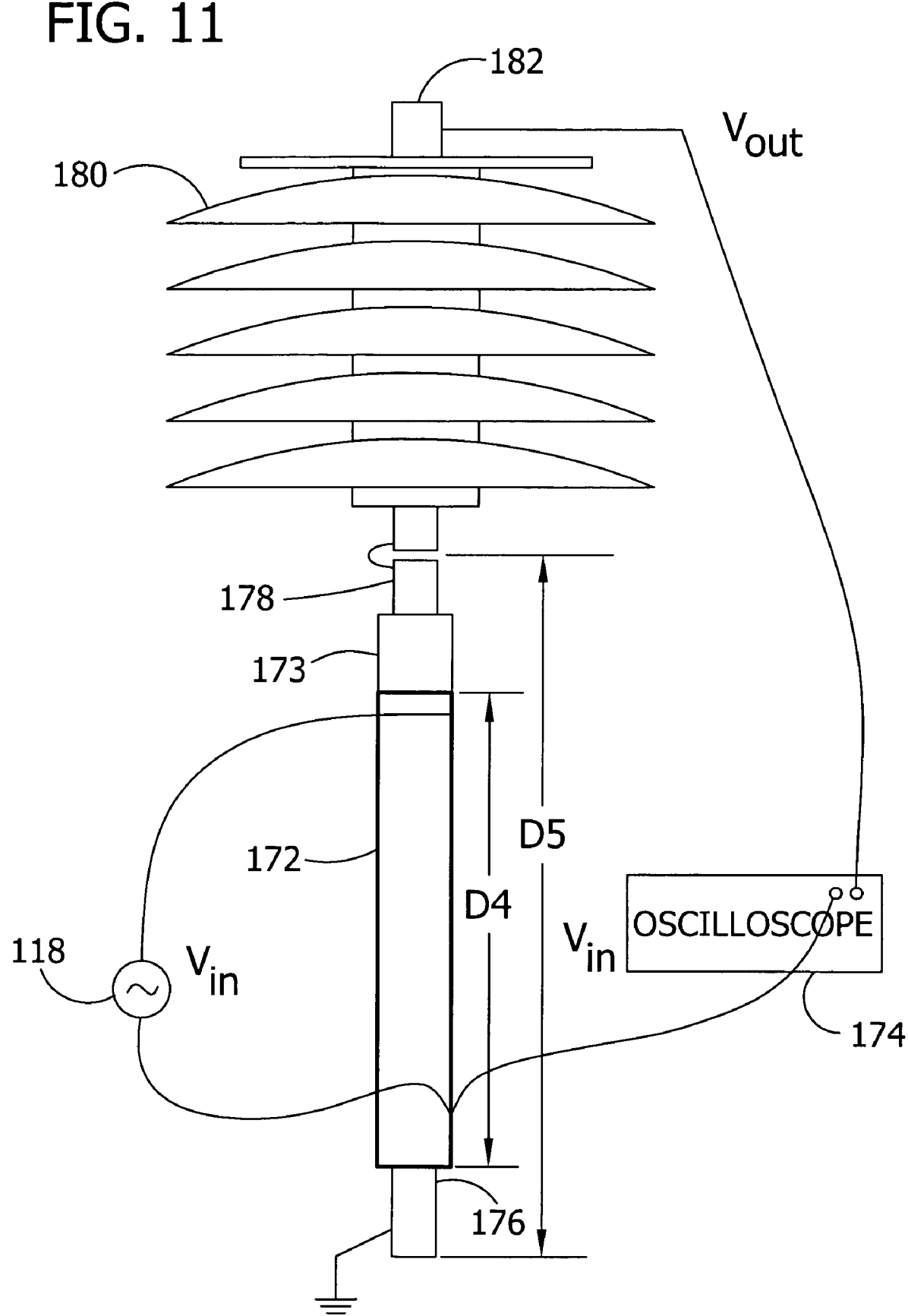
FIG. 11 shows a closed A-coupler of the present invention.

FIG. 11 shows an A-coupler in a closed circuit formed by connecting a surge arrester 180 to the top of the cable conductor shown in FIG. 9. As in the pervious case, a differential stage is attached to the output of signal generator 118. The arrester neutral 176 is grounded. The measurements consist of the voltage to ground $V_{out}$ at the neutral conductor 182 at the top of the arrester and the differential voltage across the conductor 172 (output of the generator differential stage). Insulator 173 performs the same function as insulator 144 in FIG. 5. Distances D4 and D5 are preferably 30 inches and 40 inches, respectively.

Figure 12:
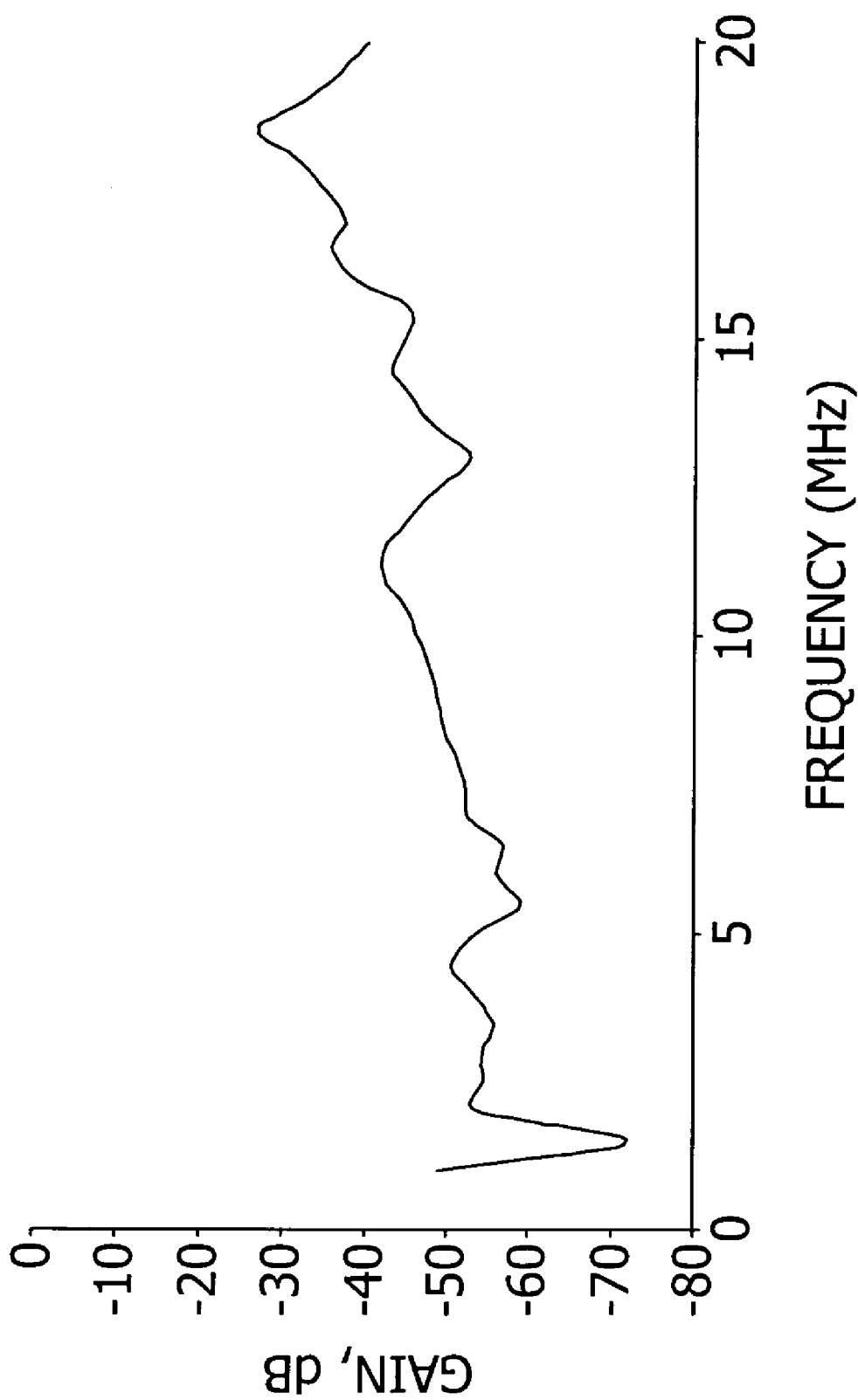
FIG. 12 shows the frequency dependent gain of the closed A-coupler.

FIG. 12 shows the transfer function gain $V_{out}/V_{in}$ measured by oscilloscope 174. The average value of the gain from 7 to 20 MHz is about −40 dB. The resonance at about 13 MHz appears in the system too, but it is not as pronounced as in the case of FIG. 10.

FIG. 13 shows a power line strung between utility poles. A neutral line 190 is shown for use in transmitting data there along (in addition to its function in the context of power distribution). FIG. 13 includes a coaxial cable 192 secured along the utility pole. Coaxial cable 192 may be any of the coaxial cable commonly found for use in carrying television and other radio frequency signals. It should be constructed suitably rugged for outdoor use. The central conductor of coaxial cable 192 is connected to neutral conductor 190 via any common connector shown schematically at 194. At the other end of coaxial cable 192, the central conductor is connected to line 118*b* of signal generator 118 and the outer conductor of coaxial cable 192 is connected to the other line, 118*a*, of signal generator 118. In this manner, signal generator 118 capacitively couples a high frequency signal containing data onto power line 190.

FIG. 13 shows a second coaxial cable 196 connected down the line from the first utility pole. The central conductor of coaxial cable 196 is connected to neutral conductor 190 via any common connector shown schematically at 198. At the other end of coaxial cable 196, the central conductor is connected to line 200*b* of detector 200 and the outer conductor of coaxial cable 196 is connected to the other line, 200*a*, of detector 200. In this manner, detector 200 is capacitively coupled to neutral line 190 for detecting the data contained in a high frequency signal coupled onto neutral line 190. In use, a modem might be positioned at each utility pole (or every so many utility poles) and capacitively coupled to neutral line 190 via a length of coaxial cable such as that shown, for example, by cables 192 and 196. The modem would preferably include a signal generator for coupling a high frequency data signal onto neutral line 190, but would also include a detector 200 for detecting and recovering a received data signal.

In use, the signal generator 118 shown in the above disclosure produced a high frequency signal at frequencies ranging up to 30 MHz for measurement of the related gain. In applications transmitting and receiving data over power lines, signal generator 118 would be used to generate a high frequency signal encoded with data for coupling on the power line in the manner of the present invention. The capacitance between U-couplers 100, 106, 130 and power line 112 shown in the above Figures is preferably at least 5 pF/cm, is more preferably 10 pF/cm and is still more preferably 15 pF/cm. Such capacitance provides effective coupling of the signal onto the power line. The length of the long section in U-couplers 100, 106, 130 is preferably at least six inches but less than 200 feet, more preferably at least 12 inches but less than 100 feet, still more preferably at least 2 feet but less than 50 feet, still more preferably at least 2 feet but less than 10 feet, and still more preferably at least 2 feet but less than 6 feet. It is believed that a conductor length in the range 2 feet to 6 feet provides the best tradeoff between performance, cost and maintenance issues. Whatever the length, an insulator is preferably position between the conductor in the coupler and the power line. The couplers are preferably used in conjunction with a neutral or ground line of the power system; however, the couplers can also be use in conjunction with a phase line for coupling a high frequency signal onto the phase line.

It is seen that the invention includes a method of installing the above couplers for use in capacitively coupling a signal onto a conductor of an electrical power delivery system. Such method includes selecting a conductive member having a length of at least six inches but less than 200 feet, or such other dimension disclosed above, and providing a data signal generator to supply a data signal to the conductive member. The method further includes positioning the conductive member to capacitively couple the data signal onto the conductor. The method can include selecting a length of coaxial cable; providing a data signal generator to supply a data signal to an outer layer of the coaxial cable; and connecting an inner conductor of the coaxial cable to the conductor of the electrical power delivery system.

The definition and use of the decibel scale is illustrated here for a two point communication channel having a channel characteristic impedance of $Z_C$ and where the receiving end of the channel terminates at a load impedance $Z_L$. The transmitted signal is given by the rms value of the voltage at a single frequency applied across the input of the channel. The received signal is given by the rms voltage at the same frequency across the channel terminating impedance $Z_L$. The following two gains are defined for the channel, the signal gain and the power gain.

The power gain $G_P$ is the ratio between the output and input power. For a passive channel (i.e. no signal amplification devices intervene between source and receiver), the power gain is always less than 1 and it represents losses in the channel.

$$G_P = P_{out}/P_{in} \qquad [\text{Eq. 1}]$$

The signal gain (or channel transfer ratio is defined according to [Eq. 2] as the ratio between the output and input signal (in this case the rms voltages).

$$G_V = V_{out}/V_{in} \qquad [\text{Eq. 2}]$$

Both the power and the voltage gains are functions of the frequency of the transmitted signal. Both gains are also real numbers. This is different from the definition of the transfer function which involves the magnitude as well as the phase relation between transmitted and received signals. The previous definitions involve only the magnitude of the transfer function.

The definition of the decibel gain proceeds from the power gain. Therefore, the equivalent decibel (dB) value $G_{P,dB}$ of $G_P$ is given from [Eq. 3]. For an ideal channel (where no losses occur) the dB power gain is zero. For a practical channel, the dB power gain is negative. A definition of the channel loss can be derived using the reciprocal of [Eq. 1].

The relation between the voltage and power gain can be obtained expressing each in dB. Assuming the channel terminates at a matching load, that is $Z_C = Z_L$, then, since there will be no reflections in the channel, the input and output powers are given by [Eq. 4]. Substituting [Eq. 4] into [Eq. 3], the dB power gain in terms of the voltage gain is derived, [Eq. 5].

$$G_{P,dB} = 10 \log (P_{out}/P_{in}) \qquad [\text{Eq. 3}]$$

$$P_{in} = (V_{in})^2/Z_C$$

$$P_{out} = (V_{out})^2/Z_C \qquad [\text{Eq. 4}]$$

$$G_{P,dB} = 10 \log [(V_{out})^2/(V_{in})^2] = 20 \log V_{out}/V_{in} \qquad [\text{Eq. 5}]$$

The convenient definition according to [Eq. 6] of the dB voltage gain $G_{V,dB}$ follows from [Eq. 5]. Definitions [Eq. 3] and [Eq. 6] are such that for the matched channel the power and signal gains have the same value when they are expressed in dB.

$$G_{V,dB} = 20 \log V_{out}/V_{in} \qquad [\text{Eq. 6}]$$

For an ideal (no-loss) channel, the power and signal dB gains are 0 when the channel is matched. The following shows the effects of mismatch and attenuation. If the channel is mismatched (i.e. $Z_L \neq Z_C$) the input power is still given by [Eq. 4], but the output power is given by [Eq. 7] involving the load impedance.

$$P_{out} = (V_{out})^2/Z_L \qquad [\text{Eq. 7}]$$

Hence, the dB power gain becomes, $$G_{P,dB} = 10 \log \{[(V_{out})^2/Z_L]/[(V_{in})^2/Z_C]\} = G_{V,dB} - 20 \log [\text{sqrt}(Z_L/Z_C)] \qquad [\text{Eq. 8}]$$

Therefore, when the channel is not matched, the dB power gain is different than the dB signal gain. The second term in [Eq. 8] represents the effect of the mismatch.

A lossy channel is characterized by a total attenuation $\alpha$ (Np). If the channel is matched, the relation between sent and received signal is, $$V_{out} = V_{in} e^{-\alpha} \qquad [\text{Eq. 9}]$$

Therefore, applying [Eq. 9] into [Eq. 5], we obtain the dB gains:

$$G_{P,dB} = G_{V,dB} = -8.69 \alpha \qquad [\text{Eq. 10}]$$

A useful definition for power calculations is the dBm unit. This unit compares the power of a signal to the 1 mW base. If P is the power of a signal, its dBm equivalent is:

$$P_{dBm} = 10 \log (P/0.001) \qquad [\text{Eq. 11}]$$

Assuming a channel has a gain $G_{P,dB}$ and if the input power to the channel is $P_{in,dBm}$ (expressed as dBm), then the output power will be:

$$P_{out,dBm} = P_{in,dBm} = G_{P,dB} \qquad [\text{Eq. 12}]$$

Note that in [Eq. 12], the channel gain has a negative value and, therefore, the output power will be reduced by the channel losses.

EXAMPLE 1

A co-axial line/channel is 50 m long and has a characteristic impedance of 75 Ω and an attenuation constant of 0.01 Np/m. The load impedance matches the channel. If a 10 mV signal is applied to the channel input, the output power can be calculated. In particular, the total channel attenuation is $\alpha = 0.01$ Np/m×50 m=0.5 Np. Using [Eq. 10], the channel gain is −4.345 dB. Equivalently, the channel loss is L=4.345 dB. If 10mV are applied to the input, the incoming power is, from [Eq. 4], $P_{in}$=1.33 μW, or equivalently, $P_{in}$=−28.75 dBm. The negative sign implies that the input power is less than 1mW. The output power may be obtained equivalently from [Eq. 12] as:

$$P_{out,dbm} = P_{in,dBm} - L = -28.75 \text{ dBm} - 4.345 \text{ dB} = -33.095 \text{ dBm}$$

Using [Eq. 11], the output power is $P_{out}$=0.49 μW. Using [Eq. 4], the output voltage is calculated to be: $V_{out}$=6.06 mV.

EXAMPLE 2

A PLC channel is 200 m long. The channel operates transmitting the ground TEM mode with an attenuation constant of 0.008 Np/m. An additional 0.02 Np/m loss occurs due to radiation of the transmitted signal to the ambient. The ambient noise level (background noise) is −80 dBm. The transmitter power in order to obtain a SNR (signal to noise ratio) of 2 at the receiver can be determined as follows: The combined attenuation constant of the channel (due to losses and radiation) is 0.01 Np/m and, therefore, the total channel attenuation is 20 Np. Hence the total channel loss is (from [Eq. 10]) L=17.4 dB. The desired SNR is 2, meaning the received voltage must be 2 times the noise voltage. The dB value of the SNR is 20 log(2)=6.02 dB. By using dB, power and signal relations can be mixed since, when expressed in dB, the respective gains are equal. When a signal is involved, the 20 log formula is used. When a power is involved, the 10 log formula is used. Since the ambient noise is −80 dBm, in order to achieve the desired SNR, the received power must be at least $P_{out}=-80+SNR=-80+6.02=-74$ dBm (approximately). Since the channel losses are 17.4 dB, the input power at the transmitter must be $P_{in}=-74+17.4=-56.6$ dBm. This value corresponds to 2.2 nW.

EXAMPLE 3

A PLC utilizes arrester couplers for the transmitting and receiving sites. The coupling gain of a single arrester coupler is shown in FIG. 2. Assuming the line losses are zero, the ambient noise is −80 dBm, and the channel operates at 10 MHz, the input power in order to obtain a SNR of 2 at the receiver can be calculated. From the previous example, SNR=6.02 dB and the minimum required received power should be $P_{out}=-74$ dBm. Using FIG. 12, the arrester coupler gain at 10 MHz is approximately −45 dB. Thus, at the receiver site the power coming at the line terminal of the arrester should be $P_{line}=-74+45=-29$ dBm. Assuming that the arrester has bilateral properties, the same loss of 45 dB occurs at the transmitter side, as the signal goes through the arrester there. Therefore, the minimum input power at the transmitter should be 45 dBm higher than the power at the line. So, $P_{in}=-29$ dBm+45 dB=16 dBm. This value corresponds to 39.8 mW. Assuming a characteristic impedance of 350 Ω for the line, the input voltage is 3.73V.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for coupling a signal onto an elongated conductor of an electrical power delivery system, the device comprising:

an elongated conductive member having a length of at least six inches but less than 200 feet, said elongated conductive member adapted to be positioned in parallel with the elongated conductor;

an insulator adapted to be positioned between the elongated conductive member and the elongated conductor along the length of the elongated conductive member such that the insulator separates the elongated conductor and the elongated conductive member along the length of the elongated conductive member and such that the elongated conductive member is capacitively coupled along its length to the elongated conductor; and a data signal generator adapted to be connected to the elongated conductive member for supplying a data signal to the elongated conductive member;

wherein the elongated conductive member is adapted to capacitively couple the data signal onto the elongated conductor.

2. The device of claim 1 wherein the elongated conductive member comprises a cable adapted to be positioned adjacent the elongated conductor.

3. The device of claim 2 wherein the elongated conductive member is formed from a piece of common insulated cable.

4. The device of claim 1 wherein the elongated conductive member comprises a conductive medium wrapped about the elongated conductor.

5. The device of claim 1 wherein the elongated conductive member comprises an outer layer of a coaxial cable; and wherein an inner conductor of the coaxial cable is adapted to be connected to the elongated conductor of the electrical power delivery system.

6. The device of claim 5 wherein an end of the inner conductor is adapted to be connected to a neutral wire or a ground wire.

7. The device of claim 1 wherein the elongated conductor comprises a neutral wire or a ground wire of the electrical power delivery system; and wherein the elongated conductive member is adapted to capacitively couple the data signal onto the neutral wire or the ground wire.

8. The device of claim 1 wherein the elongated conductor comprises a grounding wire of a surge arrester and wherein the elongated conductive member comprises a conductive medium adapted to be wrapped around the grounding wire.

9. The device of claim 1 wherein the elongated conductor comprises a phase conductor of the electrical power delivery system; and wherein the elongated conductive member is adapted to capacitively couple the data signal onto the phase conductor.

10. The device of claim 1 wherein the length of the elongated conductive member is at least 12 inches but less than 100 feet.

11. The device of claim 1 wherein the length of the elongated conductive member is at least 2 feet but less than 50 feet.

12. The device of claim 1 wherein the length of the elongated conductive member is at least 2 feet but less than 10 feet.

13. The device of claim 1 wherein the length of the elongated conductive member is at least 2 feet but less than 6 feet.

14. The device of claim 1 further comprising an insulator adapted to be positioned between the elongated conductive member and the elongated conductor.

15. The device of claim 1 wherein the elongated conductive member is adapted to be positioned along the elongated conductor such that a capacitive coupling measured between the elongated conductive member and the elongated conductor is greater than 5 pF/cm.

16. The device of claim 15 wherein the capacitive coupling measured between the elongated conductive member and the elongated conductor is greater than 10 pF/cm.

17. The device of claim 15 wherein the capacitive coupling measured between the elongated conductive member and the elongated conductor is greater than 15 pF/cm.

18. The device of claim 1 further comprising a resistor connected in series with the elongated conductive member and the data signal generator.

19. The device of claim 1 having no magnetic core for coupling the data signal onto the elongated conductor.

20. A device for capacitively coupling a signal onto an elongated conductor of an electrical power delivery system, the device comprising:

a elongated conductive member adapted to be positioned along the elongated conductor said elongated conductive member positioned in parallel with the elongated conductor;

an insulator adapted to be positioned between the elongated conductive member and the elongated conductor along the length of the elongated conductive member such that the insulator separates the elongated conductor and the elongated conductive member along the length of the elongated conductive member and such that the elongated conductive member is capacitively coupled along its length to the elongated conductor;

wherein the capacitive coupling measured between the elongated conductive member and the elongated conductor is greater than 5 pF/cm.

21. The device of claim 20 wherein the capacitive coupling measured between the elongated conductive member and the elongated conductor is greater than 10 pF/cm.

22. The device of claim 20 wherein the capacitive coupling measured between the elongated conductive member and the elongated conductor is greater than 15 pF/cm.

23. A method of installing a device for capacitively coupling a signal onto a elongated conductor of an electrical power delivery system, the method comprising the steps of:

selecting a elongated conductive member having a length of at least six inches but less than 200 feet;

providing a data signal generator to supply a data signal to the elongated conductive member;

positioning the elongated conductive member in parallel with the elongated conductor in order to capacitively couple the data signal onto the elongated conductor and positioning an insulator between the elongated conductive member and the elongated conductor along the length of the elongated conductive member such that the insulator separates the elongated conductor and the elongated conductive member along the length of the elongated conductive member.

24. The method of claim 23 wherein the selecting step further comprises selecting an insulated elongated conductive member.

25. The method of claim 23 wherein:

the selecting step further comprises selecting a cable; and the positioning step further comprises positioning the cable adjacent to the elongated conductor so that the cable capacitively couples the data signal onto the elongated conductor.

26. The method of claim 23 wherein:

the selecting step further comprises selecting a length of coaxial cable; and the providing step further comprises providing a data signal generator to supply a data signal to an outer layer of the coaxial cable; and the positioning step further comprises connecting an inner conductor of the coaxial cable to the elongated conductor of the electrical power delivery system.

27. The method of claim 26 further comprising connecting an end of the inner conductor to a neutral wire or a ground wire.

28. The method of claim 23 wherein the positioning step further comprises positioning the elongated conductive member along the elongated conductor so that a capacitive coupling measured between the elongated conductive member and the elongated conductor is greater than 10 pF/cm.

29. A device for coupling a signal onto an elongated conductor of an electrical power delivery system, the device comprising:

an elongated conductive member having a length of at least six inches but less than 200 feet, said elongated conductive member adapted to be positioned in parallel with the elongated conductor;

an insulator adapted to be positioned between the elongated conductive member and the elongated conductor along the length of the elongated conductive member such that the insulator separates the elongated conductor and the elongated conductive member along the length of the elongated conductive member and such that the elongated conductive member is capacitively coupled along its length to the elongated conductor; and a data signal generator adapted to be connected to the elongated conductive member for supplying a data signal to the elongated conductive member;

wherein the elongated conductive member is adapted to capacitively couple the data signal onto the elongated conductor without a magnetic core such that the capacitive coupling measured between the elongated conductive member and the elongated conductor is greater than 5 pF/cm.

30. A device for detecting a data signal coupled onto an elongated conductor of an electrical power delivery system, the device comprising:

a elongated conductive member having a length of at least six inches but less than 200 feet, said elongated conductive member adapted to be positioned in parallel with the elongated conductor;

an insulator adapted to be positioned between the elongated conductive member and the elongated conductor along the length of the elongated conductive member such that the insulator separates the elongated conductor and the elongated conductive member along the length of the elongated conductive member and such that the elongated conductive member is capacitively coupled along its length to the elongated conductor; and a detector connected to the elongated conductive member for detecting the data signal from the elongated conductive member;

wherein the elongated conductive member is adapted to be capacitively coupled to the elongated conductor.

31. The device of claim 30 wherein the elongated conductive member comprises a cable adapted to be positioned adjacent the elongated conductor.

32. The device of claim 31 wherein the elongated conductive member is formed from a piece of common insulated cable.

33. The device of claim 30 wherein the elongated conductive member comprises a conductive medium wrapped about the elongated conductor.

34. The device of claim 30 wherein the elongated conductive member comprises an outer layer of a coaxial cable; and wherein an inner conductor of the coaxial cable is adapted to be connected to the elongated conductor of the electrical power delivery system.

35. The device of claim 34 wherein an end of the inner conductor is adapted to be connected to a neutral wire or a ground wire.

36. The device of claim 30 wherein the elongated conductor comprises a neutral wire or a ground wire of the electrical power delivery system.

37. The device of claim 30 wherein the elongated conductor comprises a grounding wire of a surge arrester and wherein the elongated conductive member comprises a conductive medium adapted to be wrapped around the grounding wire.

38. The device of claim 30 wherein the elongated conductor comprises a phase conductor of the electrical power delivery system; wherein the elongated conductive member is adapted to capacitively couple the data signal onto the phase conductor.

39. The device of claim 30 wherein the length of the elongated conductive member is at least 12 inches but less than 100 feet.

40. The device of claim 30 wherein the length of the elongated conductive member is at least 2 feet but less than 50 feet.

41. The device of claim 30 wherein the length of the elongated conductive member is at least 2 feet but less than 10 feet.

42. The device of claim 30 wherein the length of the elongated conductive member is at least 2 feet but less than 6 feet.

43. The device of claim 30 further comprising an insulator adapted to be positioned between the elongated conductive member and the elongated conductor.

44. The device of claim 30 wherein the elongated conductive member is adapted to be positioned along the elongated conductor such that a capacitive coupling measured between the elongated conductive member and the elongated conductor is greater than 5 pF/cm.

45. The device of claim 44 wherein the capacitive coupling measured between the elongated conductive member and the elongated conductor is greater than 10 pF/cm.

46. The device of claim 44 wherein the capacitive coupling measured between the elongated conductive member and the elongated conductor is greater than 15 pF/cm.

47. The device of claim 30 further comprising a resistor connected in series with the elongated conductive member and the data signal generator.

48. The device of claim 30 having no magnetic core for coupling the data signal onto the elongated conductor.

49. A device for detecting a signal coupled onto an elongated conductor of an electrical power delivery system, the device comprising:
a elongated conductive member adapted to be positioned along the elongated conductor, said elongated conductive member adapted to be positioned in parallel with the elongated conductor; and
an insulator adapted to be positioned between the elongated conductive member and the elongated conductor along the length of the elongated conductive member such that the insulator separates the elongated conductor and the elongated conductive member along the length of the elongated conductive member and such that the elongated conductive member is capacitively coupled along its length to the elongated conductor;
wherein the capacitive coupling measured between the elongated conductive member and the elongated conductor is greater than 5 pF/cm.

50. The device of claim 49 wherein the capacitive coupling measured between the elongated conductive member and the elongated conductor is greater than 10 pF/cm.

51. The device of claim 49 wherein the capacitive coupling measured between the elongated conductive member and the elongated conductor is greater than 15 pF/cm.

52. A method of installing a device for detecting a data signal coupled onto an elongated conductor of an electrical power delivery system, the method comprising the steps of:
selecting a elongated conductive member having a length of at least six inches but less than 200 feet;
positioning the elongated conductive member in parallel with the elongated conductor in order to capacitively couple the elongated conductive member with the elongated conductor;
providing a data signal detector to detect the data signal from the elongated conductive member and
positioning an insulator between the elongated conductive member and the elongated conductor along the length of the elongated conductive member such that the insulator separates the elongated conductor and the elongated conductive member along the length of the elongated conductive member.

53. The method of claim 52 wherein the selecting step further comprises selecting an insulated elongated conductive member.

54. The method of claim 52 wherein:
the selecting step further comprises selecting a cable; and
the positioning step further comprises positioning the cable adjacent to the elongated conductor so that the cable and the elongated conductor are capacitively coupled.

55. The method of claim 52 wherein:
the selecting step further comprises selecting a length of coaxial cable; and
the providing step further comprises providing a data signal detector to detect the data signal from an outer layer of the coaxial cable; and
the positioning step further comprises connecting an inner conductor of the coaxial cable to the elongated conductor of the electrical power delivery system.

56. The method of claim 55 further comprising connecting an end of the inner conductor to a neutral wire or a ground wire.

57. The method of claim 52 wherein the positioning step further comprises positioning the elongated conductive member along the elongated conductor so that a capacitive coupling measured between the elongated conductive member and the elongated conductor is greater than 10 pF/cm.

58. A device for detecting a data signal coupled onto an elongated conductor of an electrical power delivery system, the device comprising:
an elongated conductive member having a length of at least six inches but less than 200 feet, said elongated conductive member adapted to be positioned in parallel with the elongated conductor;
an insulator adapted to be positioned between the elongated conductive member and the elongated conductor along the length of the elongated conductive member such that the insulator separates the elongated conductor and the elongated conductive member along the length of the elongated conductive member and such that the elongated conductive member is capacitively coupled along its length to the elongated conductor; and
a data signal detector adapted to be connected to the elongated conductive member for detecting the data signal from the elongated conductive member;
wherein the elongated conductive member is adapted to be capacitively coupled to the elongated conductor without a magnetic core such that the capacitive coupling measured between the elongated conductive member and the elongated conductor is greater than 5 pF/cm.

* * * * *